United States Patent
Mothilal

(10) Patent No.: US 8,407,408 B2
(45) Date of Patent: *Mar. 26, 2013

(54) STATIC WEAR LEVELING

(75) Inventor: Arunprasad Ramiya Mothilal, San Jose, CA (US)

(73) Assignee: Imation Corp., Oakdale, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/274,771

(22) Filed: Oct. 17, 2011

(65) Prior Publication Data

US 2012/0089768 A1  Apr. 12, 2012

Related U.S. Application Data

(63) Continuation of application No. 12/426,924, filed on Apr. 20, 2009, now Pat. No. 8,065,469.

(51) Int. Cl.
*G06F 13/00* (2006.01)

(52) U.S. Cl. ............ 711/103; 711/154; 711/165

(58) Field of Classification Search ........... 711/103
See application file for complete search history.

(56) References Cited

U.S. PATENT DOCUMENTS

| | | | |
|---|---|---|---|
| 5,341,339 A | 8/1994 | Wells | |
| 5,404,485 A | 4/1995 | Ban | |
| 5,479,638 A | 12/1995 | Assar et al. | |
| 5,937,425 A | 8/1999 | Ban | |
| 6,282,602 B1 | 8/2001 | Blumenau et al. | |
| 6,282,605 B1 | 8/2001 | Moore | |
| 7,096,313 B1 | 8/2006 | Chang et al. | |
| 7,120,729 B2 | 10/2006 | Gonzalez et al. | |
| 7,133,960 B1 | 11/2006 | Thompson et al. | |
| 7,441,067 B2 | 10/2008 | Gorobets et al. | |
| 7,451,264 B2 | 11/2008 | Yero | |
| 7,594,062 B2 | 9/2009 | In et al. | |
| 7,797,481 B2 | 9/2010 | Lee et al. | |
| 8,065,469 B2 * | 11/2011 | Mothilal | 711/103 |
| 2002/0129272 A1 | 9/2002 | Terrell et al. | |
| 2003/0130986 A1 | 7/2003 | Tamer et al. | |
| 2006/0069900 A1 | 3/2006 | Powers et al. | |
| 2007/0016756 A1 | 1/2007 | Hsieh et al. | |
| 2007/0028033 A1 | 2/2007 | Hsieh et al. | |
| 2007/0038802 A1 | 2/2007 | Tsai et al. | |
| 2007/0294490 A1 | 12/2007 | Freitas et al. | |
| 2008/0063210 A1 | 3/2008 | Goodman et al. | |
| 2009/0094409 A1 | 4/2009 | Yeh et al. | |
| 2009/0259819 A1 | 10/2009 | Chen et al. | |
| 2010/0023675 A1 | 1/2010 | Chen et al. | |
| 2010/0115186 A1 | 5/2010 | Chang et al. | |
| 2010/0161880 A1 | 6/2010 | You | |
| 2010/0185805 A1 | 7/2010 | Chen et al. | |

* cited by examiner

*Primary Examiner* — Son Mai

(74) *Attorney, Agent, or Firm* — Kenneth E. Levitt; Dorsey & Whitney LLP

(57) ABSTRACT

Methods permitting erasures to be performed evenly over time in memory, thereby extending the service life of a data storage device, and devices operable to perform those methods. Erasures performed on a given physical block in memory are tracked by incrementing a corresponding erase count included in an entry associated with a logical block correlated with that physical block. Each of a plurality of physical blocks included in the memory is associated with logical zones such that each logical zone comprises a different portion of the physical blocks. An erase count indicator is determined for each logical zone. When the total number of erasures for the given physical block reaches a limit, the entry associated with the logical block correlated with that physical block is exchanged with another entry associated with a logical block correlated with a physical block in a logical zone having a lower count indicator.

20 Claims, 6 Drawing Sheets

Entry 405

| Misc. Info 410 | Erase Count 415 | Chip Select Number 420 | Physical Zone Number 425 | Physical Block Number 430 |
|---|---|---|---|---|

FIGURE 4A

LTB 435

| Entry 440a | Entry 440b | | ... | | |
|---|---|---|---|---|---|
| Entry 440c | | | ... | | Entry 440n |

FIGURE 4B

MLTB 445

| LTB 450a | LTB 450b | | ... | | |
|---|---|---|---|---|---|
| LTB 450c | | | ... | | |
| | | | ... | | LTB 450n |
| LTBCycCnt 455a | LTBCycCnt 455b | | ... | | LTBCycCnt 455n |
| AveErsCnt 460a | AveErsCnt 460b | | | | AveErsCnt 460n |

FIGURE 4C

LTB 520

505:

| Entry 525a (PB0: 0) | Entry 525b (PB1: 0) | Entry 525c (PB2: 0) | . . . | | | |
|---|---|---|---|---|---|---|
| | | | . . . | Entry 525l (PB20: 0) | Entry 525m (PB21: 0) | Entry 525n (PB22: 0) |

LTB 530

| Entry 535a (PB70: 0) | Entry 535b (PB71: 0) | Entry 535c (PB72: 0) | . . . | | | |
|---|---|---|---|---|---|---|
| | | | . . . | Entry 535l (PB90: 0) | Entry 535m (PB91: 0) | Entry 535n (PB92: 0) |

LTB 520

510:

| Entry 525a (PB0: 50) | Entry 525b (PB1: 0) | Entry 525c (PB2: 0) | . . . | | | |
|---|---|---|---|---|---|---|
| | | | . . . | Entry 525l (PB20: 0) | Entry 525m (PB21: 0) | Entry 525n (PB22: 0) |

LTB 530

| Entry 535a (PB70: 0) | Entry 535b (PB71: 0) | Entry 535c (PB72: 0) | . . . | | | |
|---|---|---|---|---|---|---|
| | | | . . . | Entry 535l (PB90: 0) | Entry 535m (PB91: 0) | Entry 535n (PB92: 0) |

LTB 520

515:

| Entry 535l (PB90: 0) | Entry 525b (PB1: 0) | Entry 525c (PB2: 0) | . . . | | | |
|---|---|---|---|---|---|---|
| | | | . . . | Entry 525l (PB20: 0) | Entry 525m (PB21: 0) | Entry 525n (PB22: 0) |

LTB 530

| Entry 535a (PB70: 0) | Entry 535b (PB71: 0) | Entry 535c (PB72: 0) | . . . | | | |
|---|---|---|---|---|---|---|
| | | | . . . | Entry 525a (PB0: 50) | Entry 535m (PB91: 0) | Entry 535n (PB92: 0) |

FIGURE 5

STATIC WEAR LEVELING

CROSS-REFERENCE TO RELATED APPLICATION

The present application is a continuation of U.S. patent application No. 12/426,924 filed Apr. 20, 2009, issued Nov. 22, 2011 as U.S. Pat. No. 8,065,469, which is related to U.S. patent application Ser. No. 12/426,917, filed Apr. 20, 2009 and issued May 8, 2012 as U.S. Pat. No. 8,176,925, entitled "Logical-to-Physical Address Translation for a Removable Data Storage Device," the disclosures of both of which are incorporated herein by reference.

BACKGROUND OF THE INVENTION

1. Field of the Invention

The present invention relates generally to improving performance in data storage devices. More specifically, the present invention relates to extending the service life of a data storage device.

2. Related Art

Wear leveling generally describes techniques for prolonging the service life of some kinds of erasable computer storage media, such as EEPROM and flash memory. Storage media such as EEPROM and flash memory media have individually erasable segments or blocks, each of which can be put through a limited number of erase cycles before becoming unreliable. When information is to be written to a particular block in EEPROM or flash memory, that entire block must first be erased. With some file systems such as FAT32, an operating system such as Microsoft Windows XP or Vista updates FAT tables for every megabyte written. This exemplifies how certain blocks may be highly stressed relative to other blocks in some kinds of erasable computer storage media.

Two general classes of wear leveling exist: dynamic wear leveling and static wear leveling. Dynamic wear leveling spreads out write operations by using a portion of the total blocks in a circular FIFO. This FIFO can be filled quickly during small file transfers resulting in the same set of free blocks being repeatedly erased. This can lead to a small set of blocks being over-stressed. In static wear leveling, data at rest is moved around within memory to ensure that all blocks in a medium are written to evenly, thereby increasing service life of that medium. Present implementations of static wear leveling suffer drawbacks affecting device performance. As such, there is a need for an improved technique for wear leveling.

SUMMARY OF THE INVENTION

Embodiments of the present technology allow the service life of a data storage device to be extended.

In a first claimed embodiment, a method for extending the service life of a data storage device is disclosed. The method includes performing a physical block erasure on a first physical block in the memory, wherein the memory comprises a plurality of logical zones, and each logical zone comprises a plurality of physical blocks. The physical block erasure may be tracked by incrementally increasing a first erase count, wherein a master lookup table block comprises a plurality of lookup table blocks and stores an erase count indicator for each lookup table block, each lookup table block being associated with one logical zone and comprising a plurality of entries, and each entry being associated with one logical block and comprising an erase count for a physical block corresponding to that logical block. An actual erase count may be determined for the first physical block. The entry for a logical block corresponding to the first physical block may be exchanged with another entry within a different lookup table block when the actual erase count for the first physical block exceeds a threshold, the different lookup table block having a lower erase count indicator relative to that of the lookup table block comprising the entry for the logical block corresponding to the first physical block.

In a second claimed embodiment, a data storage device set forth. The data storage device includes a memory for storing data and a controller communicatively coupled with the memory. The memory comprises a plurality of logical zones, of which each comprises a plurality of physical blocks. The controller comprises a logic module, a deletion module, and a scheduler module. The logic module may be executable by the controller for managing a master lookup table block. The master lookup table block may comprise a plurality of lookup table blocks and store an erase count indicator for each lookup table block. Each lookup table block may be associated with one logical zone and comprise a plurality of entries. Each entry may be associated with one logical block and comprising an erase count for a physical block corresponding to that logical block. The deletion module may be executable by the controller for performing a physical block erasure on a first physical block in the memory. The scheduler module may be executable by the controller for tracking the physical block erasure by incrementally increasing a first erase count and determining an actual erase count for the first physical block. The scheduler module may be further executable by the controller for exchanging the entry for a logical block corresponding to the first physical block with another entry within a different lookup table block when the actual erase count for the first physical block exceeds a threshold, the different lookup table block having a lower erase count indicator relative to that of the lookup table block comprising the entry for the logical block corresponding to the first physical block.

A third claimed embodiment discloses a computer readable storage medium having a program embodied thereon. The program is executable by a processor to perform method for extending the service life of a data storage device. The method comprises performing a physical block erasure on a first physical block in the flash memory, wherein the memory comprises a plurality of logical zones, and each logical zone comprises a plurality of physical blocks; tracking the physical block erasure by incrementally increasing a first erase count, wherein a master lookup table block comprises a plurality of lookup table blocks and stores an erase count indicator for each lookup table block, each lookup table block is associated with one logical zone and comprises a plurality of entries, and each entry is associated with one logical block and comprises an erase count for a physical block corresponding to that logical block; determining an actual erase count for the first physical block; and exchanging the entry for a logical block corresponding to the first physical block with another entry within a different lookup table block when the actual erase count for the first physical block exceeds a threshold, the different lookup table block having a lower erase count indicator relative to that of the lookup table block comprising the entry for the logical block corresponding to the first physical block.

BRIEF DESCRIPTION OF THE DRAWINGS

FIG. 4A illustrates an exemplary entry of a lookup table block.

FIG. 4B illustrates an exemplary lookup table block included in a master lookup table block.

FIG. 4C illustrates an exemplary master lookup table block.

FIG. 5 illustrates an exemplary lookup table block updation sequence.

DETAILED DESCRIPTION OF EXEMPLARY EMBODIMENTS

The present technology provides methods for extending the service life of a data storage device and devices operable to perform those methods. Erasures performed on a given physical block in memory are tracked by incrementally increasing a corresponding erase count included in an entry associated with a logical block correlated with that physical block. Each of a plurality of physical blocks included in the memory is associated with logical zones such that each logical zone comprises a different portion of the physical blocks. An average erase count, or other erase count indicator, is determined for each logical zone. According to exemplary embodiments, when the total number of erasures for the given physical block reaches a limit, the entry associated with the logical block correlated with that physical block is exchanged with another entry associated with a logical block correlated with a physical block in a logical zone having a lower average count. This allows erasures to be performed evenly over time in the memory, thereby extending service life.

Figure 1:
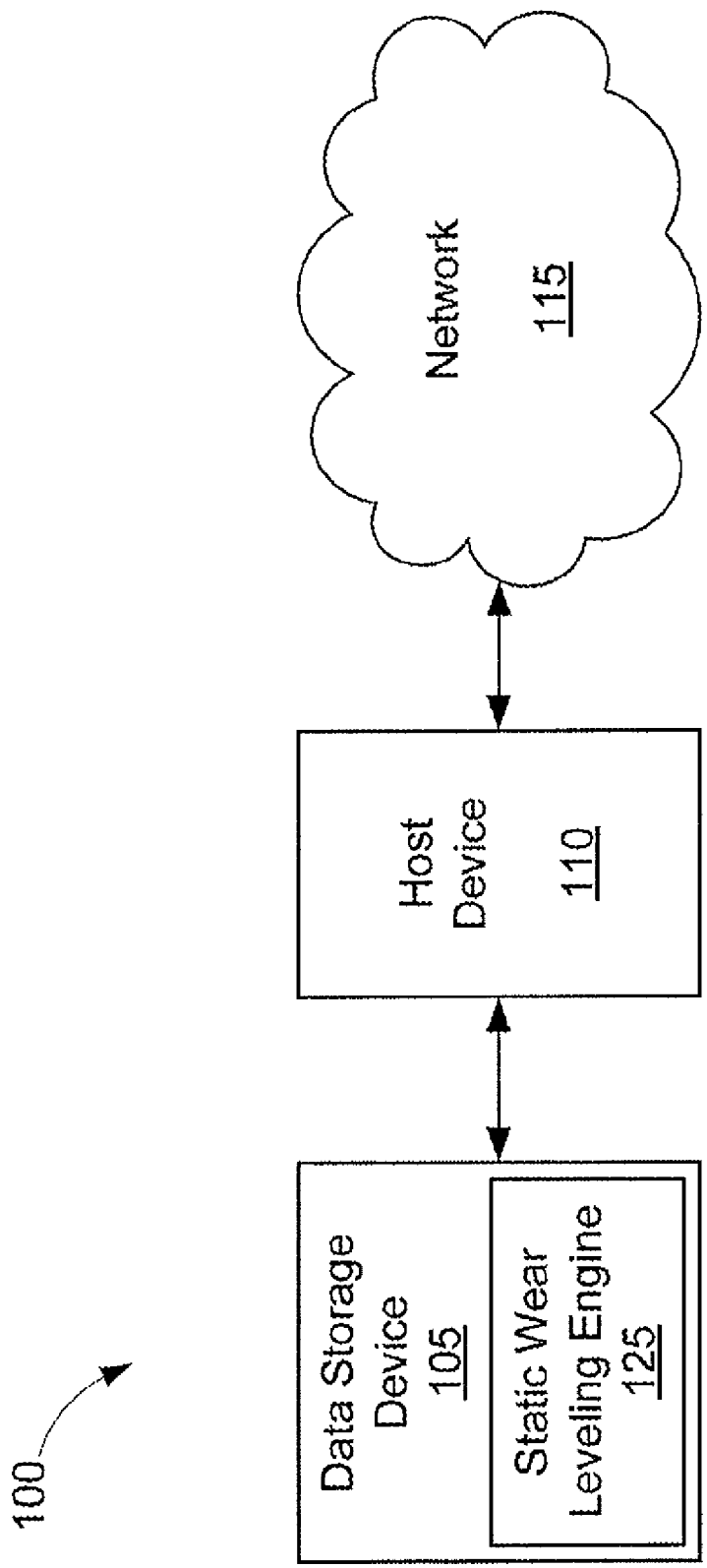
FIG. 1 is a block diagram of an exemplary environment for practicing embodiments of the present invention.

Referring now to FIG. 1, a block diagram is presented of an exemplary environment 100 in which embodiments of the present technology may be practiced. As depicted, the environment 100 includes a data storage device 105, a host device 110, and a network 115. The data storage device 105 is communicatively coupled with the host device 110, which in turn in communicatively coupled with the network 115. It is noteworthy that these communicative couplings may be wireless or wired. Furthermore, as depicted, the data storage device 105 includes a static wear leveling engine 125. The static wear leveling engine 125 is discussed further in connection with FIG. 3.

The data storage device 105 may be any device used to store digital information. In some embodiments, the data storage device 105 is portable and can be coupled or decoupled by a user with any device such as the host device 110. Examples of portable data storage devices include a USB flash drive, an external hard drives, and other peripheral storage devices. In other embodiments, the data storage device 105 is integral to the host device 110. For example, the data storage device 105 may include an internal hard drive of the host device 110. For illustrative purposes, the data storage device 105 is described herein in the context of a USB flash drive. The data storage device 105 is discussed in further detail in connection with FIG. 2.

The host device 110 includes any digital device that can interface with the data storage device 105. Generally, the host device 110 may also interface with the network 115. Examples of the host device 110 include a personal computer (PC), a personal digital assistant (PDA), a Smartphone, a digital camera, and other various devices. The host device 110 includes one or more communications interfaces (not depicted) to facilitate communicative coupling with the data storage device 105. One or more communications interfaces may also facilitate communicative coupling to the network 115. Additionally, the host device 110 includes a processor, memory such as RAM, and storage such as ROM (all not depicted). Those skilled in the art will be familiar with the components and functionality of digital devices such as the host device 110.

The network 115 may be a wide-area network and include a private network (e.g., a leased line network) or a public network (e.g., the Internet). In some embodiments, the network 115 may be a local area network and cover a relatively small geographic range. Local area networks include wired networks (e.g., Ethernet) or wireless networks (e.g., Wi-Fi). The network 115 includes hardware and/or software elements that enable the exchange of information (e.g., voice and data) between the data storage device 105 or the host device 110 and other devices communicatively coupled with the network 115. Routers or switches may be used to connect the network 115 with the host device 110.

Figure 2:
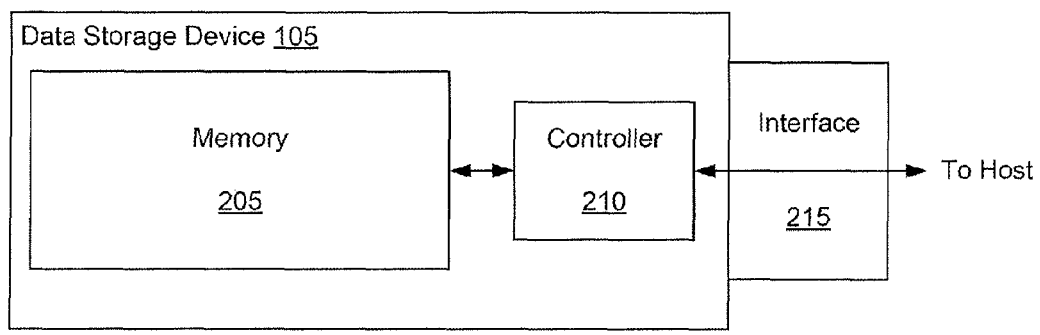
FIG. 2 is a block diagram of an exemplary data storage device employed in the environment of FIG. 1.

FIG. 2 is a block diagram of an exemplary data storage device 105 employed in the environment 100. As mentioned, the data storage device 105 can be any device that is used to store digital information, and may also be portable. The data storage device 105 depicted in FIG. 2 includes a memory 205, a controller 210, and an interface 215.

The memory 205 includes a computer-readable storage medium having a plurality of physical blocks to which data can be written to. These physical blocks may be divided into two or more physical zones such that each physical zone includes a different portion of the physical blocks. The physical zones may each correspond to a different logical zone. While common forms of computer-readable storage media include, for example, a floppy disk, a flexible disk, a hard disk, magnetic tape, any other magnetic medium, a CD-ROM disk, digital video disk (DVD), and any other optical medium, the memory 205 is described in the context of non-volatile memory that can be electrically erased and rewritten. Examples of such non-volatile memory include flash memory such as NAND flash and NOR flash. Flash memory may include single level cells, multi level cells, or a combination thereof. Additionally, the memory 205 may include more than one chip, in accordance with some embodiments, wherein each chip comprises a different portion of the physical zones and, consequently, a different portion of the logical zones. Furthermore, the memory 205 may comprise other memory technologies as they become available.

The controller 210 may be a processor or microcontroller with an amount of on-chip ROM and/or RAM. The controller 210 is communicatively coupled with the memory 205 and the interface 215. Additionally, the controller 210 includes software and/or firmware that may execute various modules described herein. As such, the controller 210 functions as an intermediary between the host device 110 and the memory 205. For example, the controller 210, or various modules executed thereby, may receive write commands from the host device 110 and determine how data associated with those write commands is managed with respect to the memory 205.

As mentioned, the data storage device 105 is communicatively coupled with the host device 110, either wirelessly or wired, in exemplary embodiments. The interface 215 facilitates this coupling by allowing information to be transferred between the data storage device 105 and the host device 110. In exemplary embodiments, the interface 215 includes a USB plug that is insertable into a mating USB port of the host device 110. Alternatively, the interface 215 may include other standards for communicative coupling such as FireWire, Ethernet, Wireless USB, or Bluetooth. Furthermore, the interface 215 may comprise other interface technologies as they become available.

Figure 3:
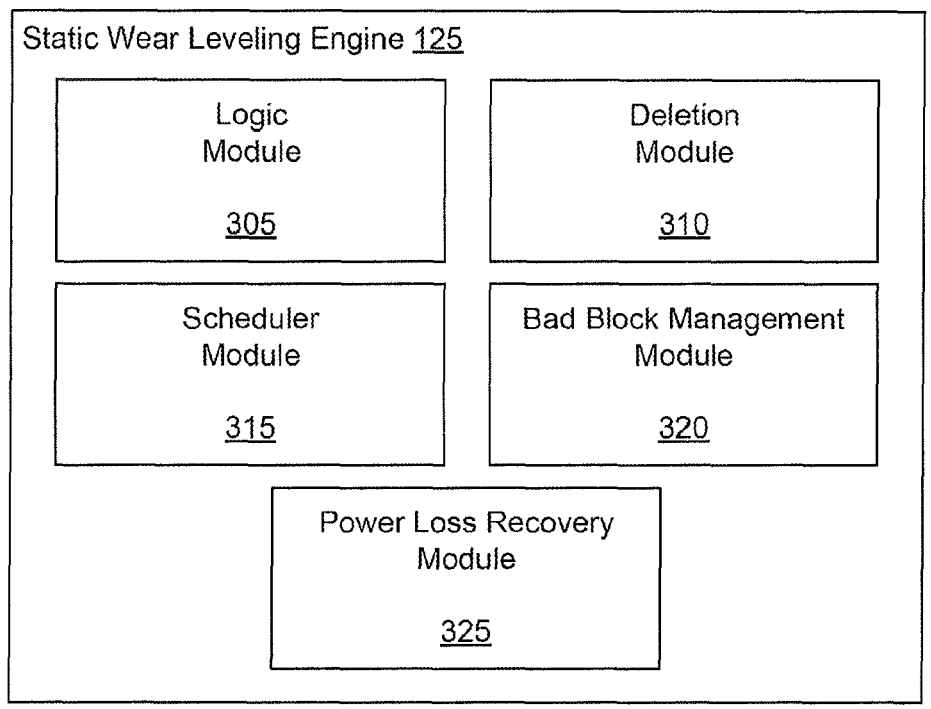
FIG. 3 is a block diagram of an exemplary static wear leveling engine included in the data storage device.

FIG. 3 is a block diagram of an exemplary static wear leveling engine 125 included in the data storage device 105. In accordance with various embodiments, the static wear leveling engine 125, or certain modules thereof, may be stored by on-chip ROM of the controller 210 and/or by the memory 205. As depicted in FIG. 3, the static wear leveling engine 125 includes a logic module 305, a deletion module 310, a scheduler module 315, a bad block management module 320, and a power loss recovery module 325. These modules may be executed by the controller 210 of the data storage device 105 to effectuate the functionality attributed thereto.

The static wear leveling engine 125 may be composed of more or fewer modules (or combinations of the same) and still fall within the scope of the present invention. For example, the functionality of the deletion module 310 and the functionality of the scheduler module 315 may be combined into a single module. Furthermore, the static wear leveling engine 125 may include various modules associated with reading and writing information to the memory 205 (not depicted).

Execution of the logic module 305 allows the controller 210 to manage a master lookup table block. The master lookup table block includes one or more lookup table blocks that, in turn, each include one or more entries. An exemplary lookup table block is described in connection with FIG. 4B, while an exemplary master table block is described in connection with FIG. 4C. Referring now to FIG. 4A, an exemplary entry 405 of a lookup table block is illustrated. The entry 405 is associated with a logical block correlated with a physical block. The entry 405 includes miscellaneous information 410, an erase count 415, a chip select number 420, a physical zone number 425, and a physical block number 430. The entry 405 may have a fixed size in memory. In exemplary embodiments, the entry 405 has a size of four bytes. Accordingly, in one example, the miscellaneous information 410 may be allotted four bits, the erase count 415 may be allotted twelve bits, the chip select number 420 may be allotted three bits, the physical zone number 425 may be allotted four bits, and the physical block number 430 may be allotted nine bits.

The miscellaneous information 410 may be used to store any information related to the entry 405, the logical block associated with the entry 405, the physical block correlated with that logical block, or any other information. The erase count 415 may be used to track erasures performed on the physical block correlated with the logical block associated with the entry 405. Since the amount of memory allotted to erase count 415 may be fixed, the erase count 415 may be reset to zero when the erase count 415 reaches a limit. For example, if the erase count 415 is allotted twelve bits, the erase count 415 can track 4096 erasures prior to resetting to zero. That resetting may then be reflected by a cycle count kept in the master lookup table block, as discussed further herein. As mentioned, the memory 205 may include more than one chip. The chip select number 420 may identify a chip that includes the physical block correlated with the logical block associated with the entry 405. The physical block number 430 identifies the physical block correlated with the logical block associated with the entry 405.

FIG. 4B illustrates an exemplary lookup table block (LTB) 435 included in a master lookup table block. The lookup table block 435 includes any number of entries 440a-440n, each being similar to entry 405. In exemplary embodiments, each lookup table block is associated with one logical zone in that the entries (e.g., entry 405) included in a particular lookup table block are associated with logical blocks correlated with physical blocks in a single logical zone. Additionally, duplicates of the entries 440a-440n may be included in the lookup table block 435, in accordance with some embodiments, as discussed further in connection with the power loss recovery module 325.

FIG. 4C illustrates an exemplary master lookup table block (MLTB) 445. The master lookup table block 445 includes any number of lookup table blocks (LTB) 450a-450n, each being similar to lookup table block 435. In addition to the lookup table blocks 450a-450n, the master lookup table block 445 may further include one or more erase count indicators associated with each of the lookup table blocks 450a-450n. One such erase count indicator is a lookup table block cycle count, which may be incrementally increased each time the erase count 415 of a constituent entry is reset to zero. A lookup table block cycle count (LTBCycCnt) 455a may correspond to lookup table block 450a, while lookup table block cycle count 455n may correspond to lookup table block 450n. Incidentally, lookup table block cycle counts may be used in combination with erase count 415 to determine the actual erase count of a particular physical block. Another erase count indicator is an average erase count for the entries of a particular lookup table block. For example, the average erase count (AveErsCnt) 455a indicates the average erase count of the entries included in the lookup table block 450a, while the average erase count 455n indicates the average erase count of the entries included in the lookup table block 450n.

Returning to FIG. 3, execution of the deletion module 310 allows the controller 210 to perform physical block erasures on the physical blocks included in the memory 205. As mentioned, when information is to be written to a particular physical block in EEPROM or flash memory, that entire physical block must first be erased. Accordingly, the physical block erasures performed via execution of the deletion module 310 may likely follow receipt of a write command from the host device 110. Furthermore, these erasures may also be performed while the memory 205 is being formatted.

Execution of the scheduler module 315 allows the controller 210 to perform a number of functions with respect to wear leveling in the memory 205 of the data storage device 105. For example, the schedule module 315 may be executed to track physical block erasures performed via execution of the deletion module 310 by incrementally increasing erase counts included in entries of the lookup table blocks. For example, if the deletion module 210 is executed to erase the physical block correlated with the logical block associated with the entry 405 (referring to FIG. 4A), the scheduler module 315 can be executed to track that erasure by incrementally increasing the erase count 415. When the erase count 415 reaches a limit (e.g., 4096), the scheduler module 315 is executed to reset the erase count to zero. Accordingly, the scheduler module 315 may also be executed to incrementally increasing a lookup table block cycle count for a lookup table block when an erase count indicated in an entry of that lookup table block reaches the limit The scheduler module 315 may also be executed to determining actual erase counts for the physical blocks of the memory 205. As mentioned, the actual erase count for a particular physical block may be determined with the erase count in the entry associated with the logical block correlated with that physical block in conjunction with the lookup table block cycle count for the lookup table block that includes that entry.

Additionally, the scheduler module 315 may be executed to exchange entries between different lookup table blocks. For example, an entry for a logical block correlated with a physical block that has been erased a threshold number of times can be exchanged with another entry that is included in a different lookup table block having a lower average erase count. The threshold number of erasures can be any value depending on characteristics of the memory 205. In embodiments in which the memory 205 comprises more than on chip, the entries being exchanged may be associated with logical blocks associated with physical blocks on separate chips.

Execution of the bad block management module 320 allows the controller 210 to screen the physical blocks of the memory 205 to identify any inoperable physical blocks. In an event that inoperable physical blocks are identified, the scheduler module 315 is informed such that entries (e.g., entry 405) are prevented from being exchanged with another entry associated with a logical zone correlated with the inoperable physical block. A bad block table (not depicted) may be maintained by the bad block management module 320 that tracks information related to inoperable physical blocks (e.g., physical block number, zone number, chip select number, etc.).

Execution of the power loss recovery module 325 allows the controller 210 to reconstruct lookup table blocks after a loss of power to the data storage device 105. As mentioned, duplicates of entries (e.g., duplicates of the entries 440a-440n) may be included in lookup table blocks (e.g., the lookup table block 435), in accordance with some embodiments. The entries and duplicates may be stored temporarily in a buffer during operation of the data storage device 105. The buffer may be included in on-chip RAM of the controller 210. When an entry included in the master lookup table block matches what is reflected in the buffer, that entry included in the master lookup table block is considered valid. This is likewise true for the duplicates included in the master lookup table. In an event of sudden or unexpected loss of power to the data storage device 105, a most current update of entries and/or duplicates in the buffer may be lost. Upon re-powering of the data storage device 105, the power loss recover module 325 can be executed to determine whether a given entry and duplicate are valid. If both the given entry and duplicate are invalid, either the entry or the duplicate may be selected and used to reconstruct update the corresponding lookup table block.

Turning now to FIG. 5, an exemplary lookup table block updation sequence 500 is illustrated. For brevity, a subset of stages (i.e., stages 505, 510, and 515) of the updation sequence 500 is depicted in FIG. 5. As depicted in stage 505, the lookup table block 520 includes entries 525a-525n. Each of the entries 525a-525n is associated with a logical block correlated with a physical block. For example, the entry 525a is associated with a logical block correlated with physical block number zero (PB0), which has been erased zero times denoted by 'PB0:0'. The lookup table block 530, as depicted in stage 505, includes entries 535a-535n. Similarly, the entries 535a-535n each are associated with a logical block correlated with a physical block. For example, the entry 535m is associated with a logical block correlated with physical block number ninety one (PB91), which has been erased zero times denoted by 'PB91: 0'.

In stage 510, physical block zero (PB0) has been erased fifty times, denoted as 'PB0: 50' in the entry 525a. Since several erasures have occurred in physical blocks associated with the lookup table block 520, the lookup table block 520 may be considered 'hot'. Conversely, lookup table block 530 may be considered 'cold' since few in any erasures have occurred in physical blocks associated with the lookup table block 530. Assuming, for this example, that fifty erasures is a threshold, the entry 525a should be exchanged with an entry from a 'cold' lookup table block. In stage 515, entry 525a has been exchanged with entry 535l from lookup table block 530. Resultantly, erasures concentrated to certain logical blocks may be spread across numerous physical blocks, thereby extending the service life of the data storage device 105.

Figure 6:
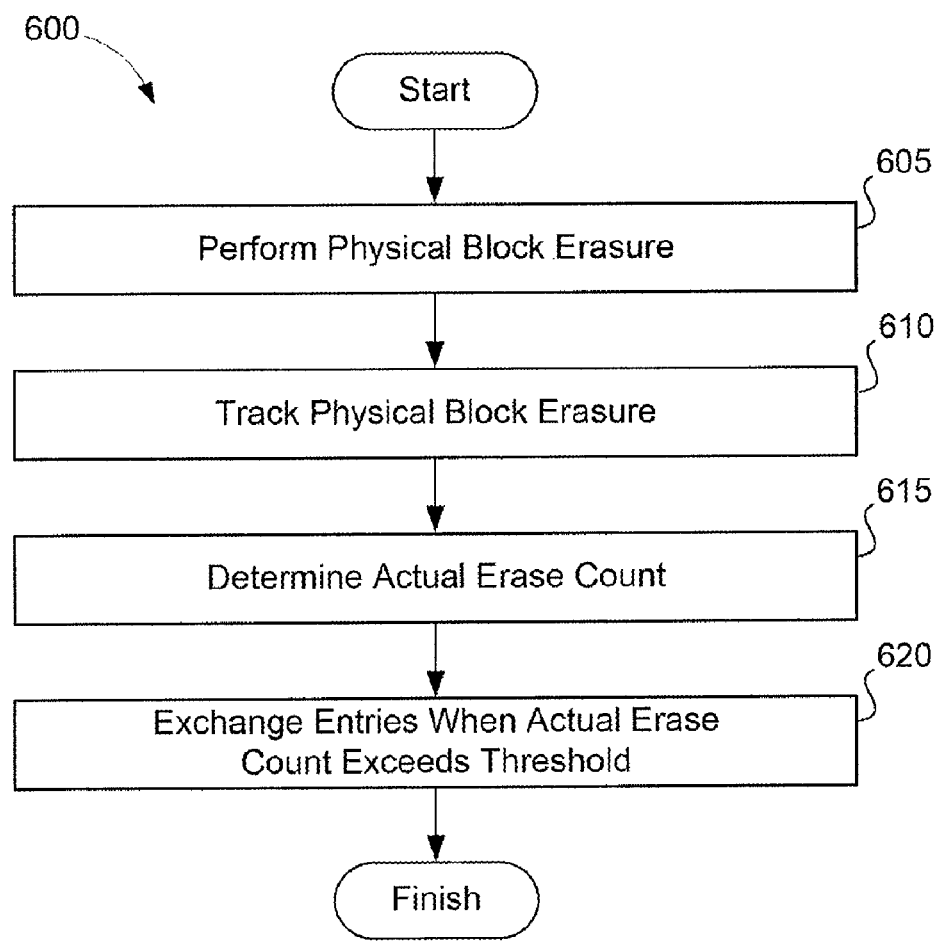
FIG. 6 is a flowchart of an exemplary method for extending the service life of the data storage device.

FIG. 6 is a flowchart of an exemplary method 600 for static wear leveling in the data storage device 105. The steps of the method 600 may be performed in varying orders. Steps may be added or subtracted from the method 600 and still fall within the scope of the present technology.

In step 605, a physical block erasure is performed. This may be performed on a first physical block in the memory 205, wherein the memory 205 comprises a plurality of logical zones, and each logical zone comprises a plurality of physical blocks. In exemplary embodiments, step 605 is performed through execution of the deletion module 310.

In step 610, the physical block erasure is tracked. According to exemplary embodiments, the physical block erasure is tracked by incrementally increasing a first erase count. It is noted that a master lookup table block may comprise a plurality of lookup table blocks and store an erase count indicator for each lookup table block. In turn, each lookup table block may be associated with one logical zone and comprise a plurality of entries. Each entry may be associated with one logical block and comprising an erase count for that logical block. The logic module 305 may be executed to manage the master lookup table block and the constituent parts, while the scheduler module 315 may be executed to perform step 610.

In step 615, an actual erase count is determined. For example, the scheduler module 315 may be executed to determine an actual erase count for the first physical block. The actual erase count for the first physical block may be determined using the first erase count in conjunction with an erase count indicator for the corresponding lookup table block.

In step 620, entries are exchanged when the actual erase count exceeds a threshold. In exemplary embodiments, the entry for a logical block corresponding to the first physical block may be exchanged with another entry within a different lookup table block when the actual erase count for the first physical block exceeds a threshold. The different lookup table block may have a lower erase count indicator relative to that of the lookup table block comprising the entry for the logical block corresponding to the first physical block. Step 620 may be performed by the scheduler module 315.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method comprising:

performing a physical block erasure on a first physical block in a memory, wherein the memory comprises a plurality of physical blocks;

incrementally increasing a first erase count for the first physical block, wherein a master lookup table comprises a plurality of lookup table blocks and stores an erase count indicator for each lookup table block, each lookup table block comprising a plurality of entries, each entry associated with a logical block and comprising an erase count for a physical block corresponding to that logical block;

determining an actual erase count for the first physical block based on the entry for a logical block corresponding to the first physical block; and exchanging the entry with another entry within a different lookup table block when the actual erase count exceeds a threshold, the different lookup table block having a lower erase count indicator relative to that of the lookup table block comprising the entry for the logical block corresponding to the first physical block.

2. The method of claim 1, further comprising incrementally increasing an erase cycle count for a lookup table block of the plurality of lookup table blocks when the erase count of an entry within that lookup table block reaches a limit.

3. The method of claim 2, wherein the erase count indicator for each lookup table block comprises the erase cycle count for that lookup table block.

4. The method of claim 1, wherein the erase count indicator for each lookup table block comprises an average erase count of the entries of that lookup table block.

5. The method of claim 1, further comprising screening the plurality of physical blocks to identify inoperable physical blocks.

6. The method of claim 5, further comprising preventing the entry from being exchanged when the other entry within the different lookup table block is associated with logical block that corresponds to a physical block that is identified as inoperable.

7. A device comprising:
a data storage medium comprising a plurality of physical blocks for storing data; and
a controller for storing data on the data storage medium, the controller comprising:
  a logic module executable by the controller to manage a master lookup table comprising an erase count indicator for each of a plurality of lookup table blocks, each lookup table block comprising a plurality of entries, each entry associated with a logical block and comprising an erase count for a physical block corresponding to that logical block;
  a deletion module executable by the controller to perform a physical block erasure on a first physical block in the data storage medium; and
  a scheduler module executable by the controller to increase the erase count in a first entry in a first lookup table block, wherein the first entry is associated with a logical block corresponding to the first physical block;
  wherein the scheduler module is further executable by the controller to exchange the first entry with a second entry within a second lookup table block when the erase count exceeds a threshold, the second lookup table block having a lower erase count indicator than the first lookup table block.

8. The device of claim 7, wherein the scheduler module is executable by the controller to increase an erase cycle count for each of the lookup table blocks when the erase count of any entry within that lookup table block reaches a limit.

9. The device of claim 7, wherein the erase count indicator for each lookup table block comprises the erase cycle count for that lookup table block.

10. The device of claim 7, wherein the controller further comprises a block management module executable by the controller to identify inoperable physical blocks within the plurality of physical blocks.

11. The device of claim 10, wherein the scheduler module is further executable by the controller to prevent exchanging the first entry with the second entry when the second entry is associated with a logical block corresponding to a physical block that is identified as inoperable.

12. A portable data storage device comprising the device of claim 7, wherein the data storage medium comprises flash memory.

13. The portable data storage device of claim 12, wherein the flash memory comprises two or more chips, each chip comprising different portions of the plurality of logical blocks.

14. The portable data storage device of claim 13, wherein the first and second entries are associated with the first and second physical blocks on separate memory chips.

15. A data storage device comprising:
memory comprising a plurality of physical blocks for storing data; and
a controller communicatively coupled with the memory, the controller configured for:
  managing a master lookup table comprising erase count indicators for each of a plurality of lookup table blocks, the lookup table blocks comprising entries for each of the plurality of physical blocks, each entry associated with a logical block and comprising an erase count for a physical block corresponding to that logical block;
  performing a physical block erasure on a first physical block in the memory;
  incrementally increasing an erase count comprised within a first entry in a first lookup table block, the first entry associated with a first logical block corresponding to the first physical block; and
  when the erase count exceeds a threshold, exchanging the first entry with a second entry in a second lookup table block, the second entry associated with a second logical block corresponding to a second physical block, wherein the second lookup table block has a lower erase count indicator than the first lookup table block.

16. The data storage device of claim 15, wherein the erase count indicators comprise erase cycle counts for each of the lookup table blocks.

17. The data storage device of claim 15, wherein the erase count indicators comprise average erase counts of the entries comprised within each of the lookup table blocks.

18. The data storage device of claim 15, wherein the controller is further configured to prevent exchanging the first entry with the second entry when the second entry is associated with a logical block corresponding to a physical block identified as an inoperable.

19. The data storage device of claim 15, wherein the memory comprises a magnetic data storage medium.

20. A flash drive comprising the data storage device of claim 15 coupled to a USB port.

* * * * *